United States Patent
Jin et al.

(10) Patent No.: US 8,228,634 B2
(45) Date of Patent: Jul. 24, 2012

(54) INTEGRATED FOCUSING ELEMENTS FOR TAMR LIGHT DELIVERY SYSTEM

(75) Inventors: Xuhui Jin, San Jose, CA (US); Erhard Schreck, San Jose, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 392 days.

(21) Appl. No.: 12/655,767

(22) Filed: Jan. 7, 2010

(65) Prior Publication Data

US 2011/0164334 A1    Jul. 7, 2011

(51) Int. Cl.
*G11B 5/127*    (2006.01)
(52) U.S. Cl. .................................................. 360/125.31
(58) Field of Classification Search .............. 360/125.31
See application file for complete search history.

(56) References Cited

U.S. PATENT DOCUMENTS

| | | | |
|---|---|---|---|
| 6,873,576 B1 | 3/2005 | Van Kesteren | |
| 7,239,481 B2 * | 7/2007 | Lille et al. | 360/125.31 |
| 7,289,422 B2 * | 10/2007 | Rettner et al. | 369/300 |
| 7,365,941 B2 | 4/2008 | Poon et al. | |
| 7,483,229 B2 * | 1/2009 | Rausch et al. | 360/59 |
| 7,609,480 B2 * | 10/2009 | Shukh et al. | 360/125.74 |
| 7,729,086 B1 * | 6/2010 | Song et al. | 360/125.31 |
| 7,952,827 B2 * | 5/2011 | Ohta et al. | 360/59 |
| 7,974,046 B2 * | 7/2011 | Ota et al. | 360/294.7 |
| 8,116,034 B2 * | 2/2012 | Komura et al. | 360/125.31 |
| 2006/0233061 A1 | 10/2006 | Rausch et al. | |
| 2006/0256694 A1 | 11/2006 | Chu et al. | |
| 2008/0117727 A1 | 5/2008 | Matsumoto | |
| 2008/0123219 A1 | 5/2008 | Gomez et al. | |
| 2008/0192376 A1 | 8/2008 | Tanaka et al. | |
| 2008/0198496 A1 | 8/2008 | Shimazawa et al. | |
| 2008/0316872 A1 | 12/2008 | Shimizu et al. | |

* cited by examiner

*Primary Examiner* — Mark Blouin
(74) *Attorney, Agent, or Firm* — Saile Ackerman LLC; Stephen B. Ackerman (57) ABSTRACT

A device to facilitate Thermally Assisted Magnetic Recording (TAMR), and a method for its manufacture, are described. One or more cylindrical lenses are used to focus light from a laser diode onto a wave-guide and a nearby plasmon antenna. Five embodiments of the invention are described, each one featuring a different way to couple the laser light to the optical wave-guide.

32 Claims, 7 Drawing Sheets

INTEGRATED FOCUSING ELEMENTS FOR TAMR LIGHT DELIVERY SYSTEM

FIELD OF THE INVENTION

The invention relates to the general field of magnetic recording with particular reference to achieving very high storage densities through use of thermally assisted magnetic recording.

BACKGROUND OF THE INVENTION

Thermally assisted magnetic recording (TAMR) is expected to facilitate magnetic recording at a 1~10 Tb/inch$^2$ data density. TAMR converts optical power into highly localized heating in a magnetic recording medium so as to temporarily reduce the field needed to switch the magnetizations of the medium grains. The steep temperature gradient (alone or together with an already-present high magnetic field gradient) enables data storage density to be improved beyond what can be achieved by current state-of-the-art magnetic recording technologies.

A TAMR head, in addition to the standard magnetic recording components, usually comprises a wave-guide (WG) and a Plasmon antenna (PA) or Plasmon generator (PG). The WG acts as an intermediate path to guide the externally generated laser light to the PA or PG, where the WG's optical mode is coupled to the local Plasmon mode of the PA or to the propagating Plasmon mode of the PG. The optical energy, after being converted to Plasmon energy, either through local Plasmon excitation in the PA or through energy transmission along the WG, now has a substantially higher frequency than it had when it emerged from the LD. As a result, its concentration at the location where heating of the media is desired in order to achieve TAMR is no longer diffraction limited.

Figure 1A:
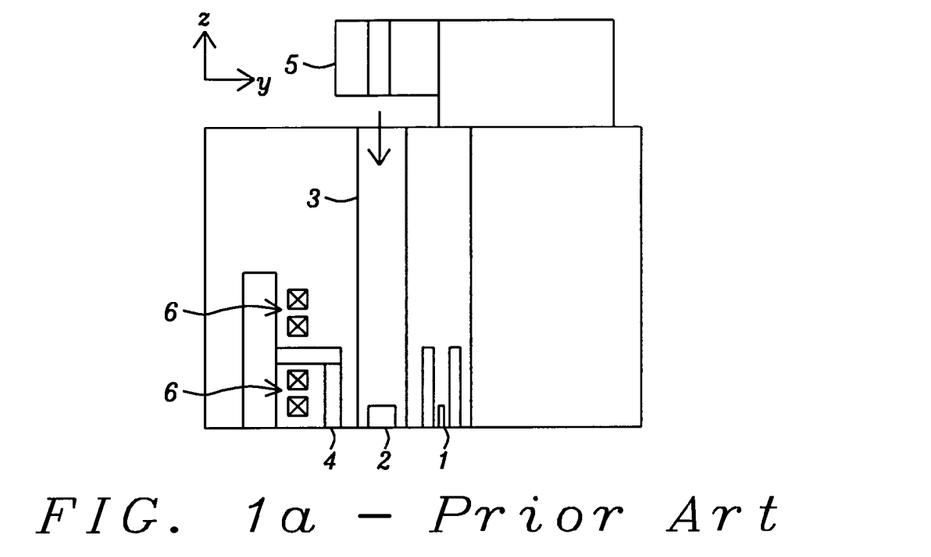
FIGS. 1a and 1b show a device of the prior art
Figure 1B:
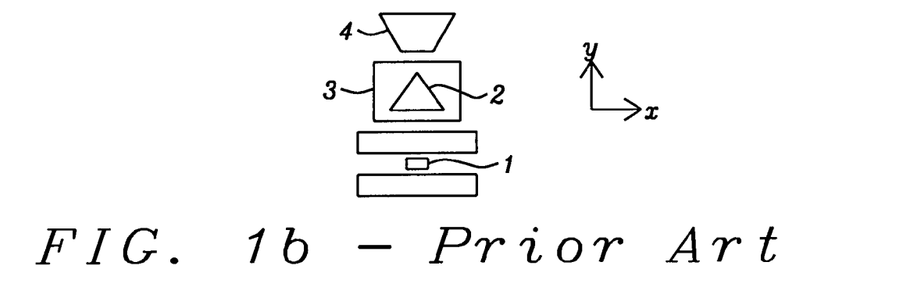

Prior art proposals [1-2] describe a head structure of the type illustrated in FIGS. 1a and 1b for the achievement of TAMR. FIG. 1a is a cross-sectional view while FIG. 1b is an air bearing surface (ABS) view. Shown there are read head 1, plasmon antenna (or generator) 2, wave-guide 3, perpendicular write pole 4, and laser diode (LD) 5, that is mounted on the top of the slider. And field coils 6. The laser beam exits laser diode 4 and couples directly into WG 3. The PG is used to excite the Edge Plasmon (EP) mode, which confines the energy to the end of the sharp tip since it is no longer subject to optical diffraction effects.

There are, however, some serious limitations associated with these prior art designs. For example, a specially designed suspension and bonding pads are required to mount the LD on the slider. The 'end fire' coupling method (butted ends with no intermediate focusing aids) is typically used to directly couple the laser beam from the LD into the waveguide. This method has low efficiency because of the divergent nature of the beam that emerges from the LD. Also, the precise alignment that is needed between the LD and the wave-guide means that assembly and packaging become unappealingly expensive.

[1] K. Tanaka, K. Shimazawa, and T. Domon, "Thermally assisted magnetic head," US Patent Pub. #US 2008/0192376 A1 (2008)
[2] K. Shimazawa, and K. Tanaka, "Near-field light generator plate, thermally assisted magnetic head, head gimbal assembly, and hard disk drive," US Patent Pub. #US2008/0198496 A1 (2008)

A routine search of the prior art was performed with the following additional references of interest being found:

In U.S. Pat. No. 7,365,941, Poon et al. disclose an optical head including a laser beam directing mirror and a beam-focusing lens. Van Kesteran, in U.S. Pat. No. 6,873,576, teaches that laser light is preferably focused on a disk by an optical lens via a mirror while US 2008/0316872 (Shimizu et al.) shows a lens and mirror in conjunction with a waveguide.

Gomez et al. disclose a lens to emit a collimated beam in US 2008/0123219 while Matsumoto shows a collimator lens, to focus light exiting from a waveguide, in US 2008/0117727. In US 2006/0256694, Chu et al. show a focusing lens, a steerable mirror, and a waveguide while Rausch et al. disclose a lens, waveguide, and curved or straight mirror in US 2006/0233061.

SUMMARY OF THE INVENTION

It has been an object of at least one embodiment of the invention to provide a TAMR device based on very local heating of recording media by plasmon emission.

Another object of at least one embodiment of the invention has been that said TAMR device not require a specially designed suspension and bonding pads for mounting a laser diode on the slider.

Still another object of at least one embodiment of the invention has been to efficiently couple light from said laser diode to a plasmon antenna.

A further object of at least one embodiment of the invention has been to eliminate back-reflection of light into the laser diode from the interior wall of the cavity in which said laser diode is mounted.

These objects have been achieved by forming one or more cylindrical lenses that focus light from the laser diode onto a nearby wave-guide where this light is transduced into plasmons that then travel to the location at which TAMR is to occur.

An important feature of the invention is that the laser diode is fully integrated into the slider structure so there is negligible increase in slider height and no increase of the drive's the disk-disk spacing becomes necessary.

Five embodiments of the invention are described, each one featuring a different way of coupling the laser light to the wave-guide.

BRIEF DESCRIPTION OF THE DRAWINGS

FIGS. 5a-8b illustrate successive steps used in a process for manufacturing the first embodiment.

FIGS. 10a-11b show the next steps for manufacturing the second embodiment.

FIGS. 12a-13b show the next steps for manufacturing the third embodiment.

DESCRIPTION OF THE PREFERRED EMBODIMENTS

Figure 2A:
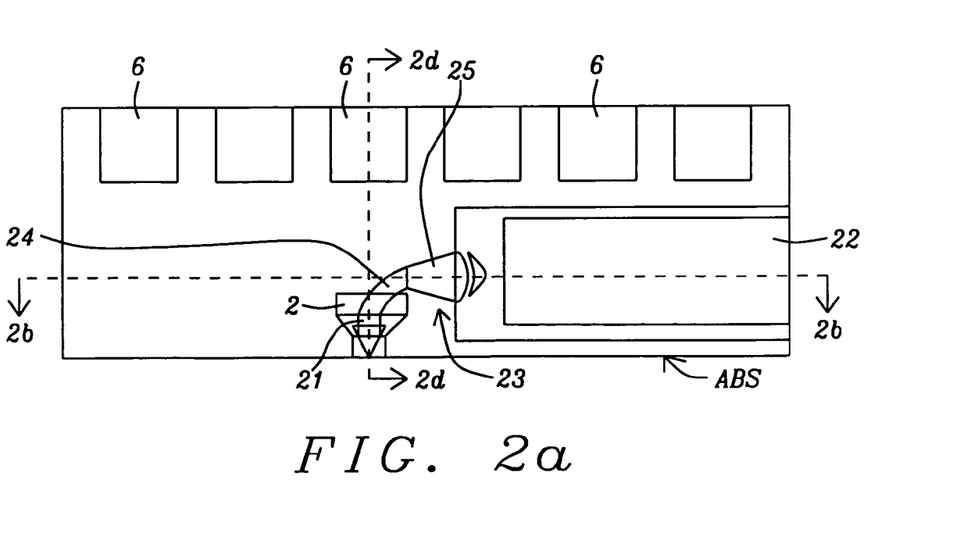
FIGS. 2a-2d show a first embodiment of the invention in which a cylindrical lens is used to focus light from a laser diode onto a wave-guide.
Figure 2B:
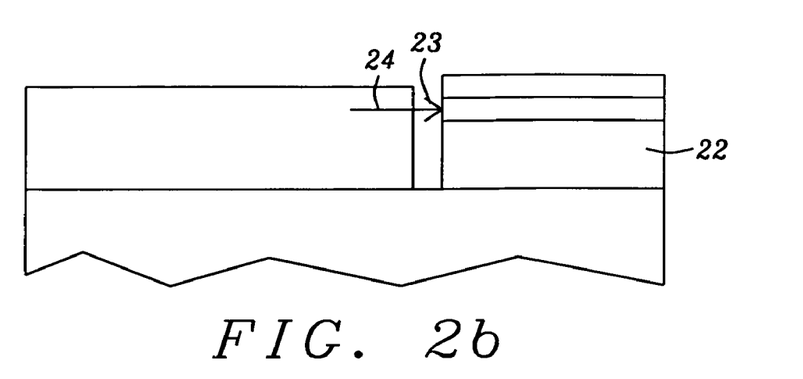
Figure 2C:
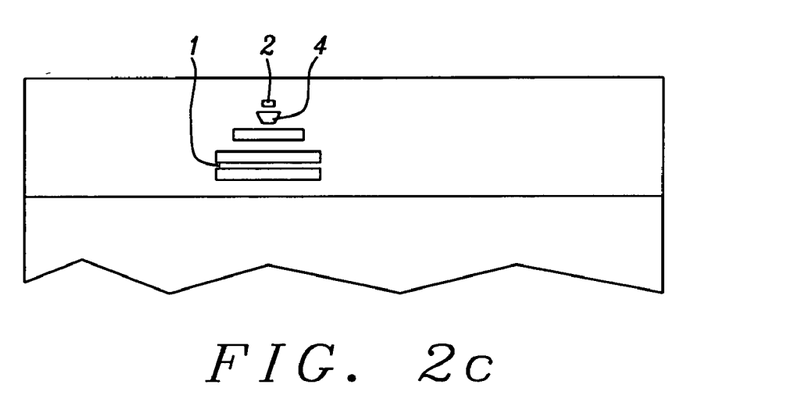
Figure 2D:
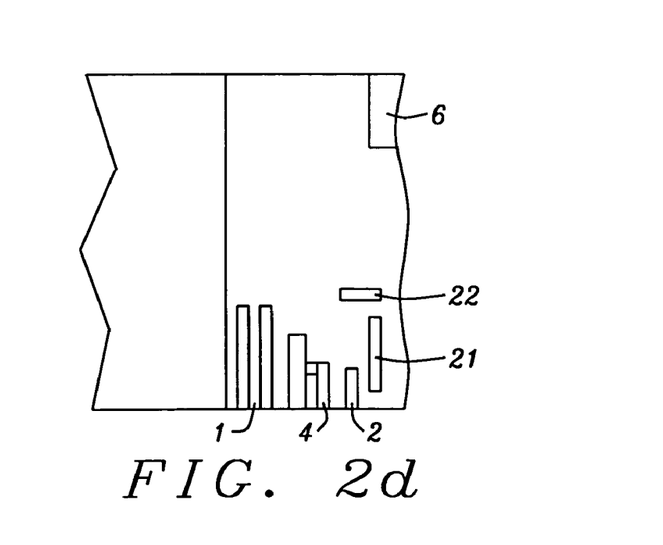

A key feature of the present invention is to introduce an integrated focusing element into the light delivery path from the LD to the WG to compensate for the LD's divergent beam, thereby improving the coupling efficiency between the light delivery system and the WG. Referring now to FIG. 2a, shown there, as a first embodiment of the present invention, is a schematic view of a TAMR head whose light delivery system includes an integrated focusing lens 23, waveguide 2 with a tapered portion 25, a curved portion 24, a linear portion 21, and an edge emitting LD 22 located in a cavity of the slider. FIGS. 2b and 2d show cross-sections, cuts made as marked, while FIG. 2c is an ABS view.

The lens, along with the tapered WG structure, serves to improve the coupling efficiency and placement tolerance of the laser diode. Both the lens and the taper are designed to phase-match the LD's wave front. Both are readily formed at the same time as the waveguide when the manufacturing process is still at the wafer level. Depending on the configuration selected, the lens could either focus or collimate the laser beam.

Figure 3A:
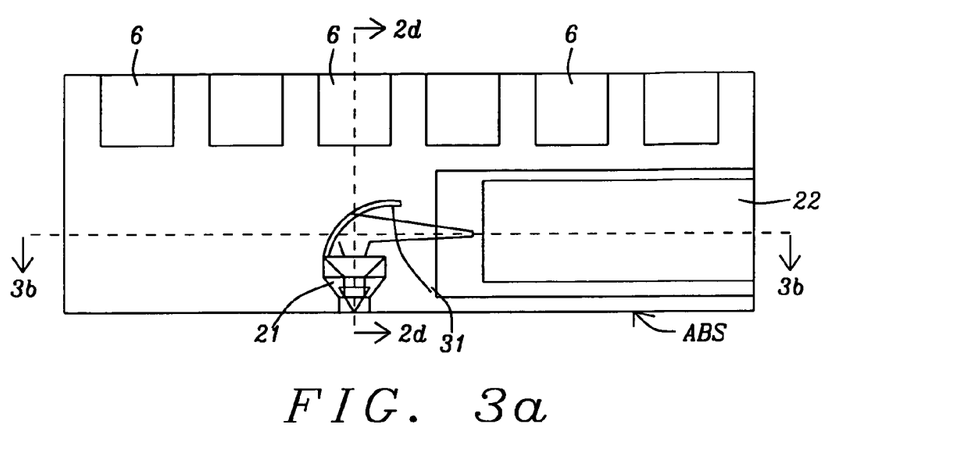
FIGS. 3a-3b illustrate a second embodiment of the invention in which focusing is achieved by means of a concave mirror.
Figure 3B:
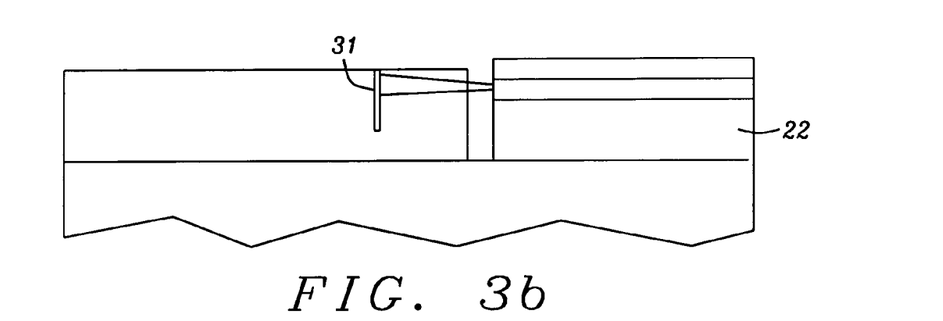

For the second embodiment, an alternative method for focusing or collimating the divergent laser beam is disclosed wherein curved out-of-plane mirror 31 is inserted in the laser path, as illustrated in FIG. 3a, FIG. 3b being a cross-section as marked. Mirror 31 may be given a spherical or a parabolic shape, as required to best direct and focus the laser beam at the inlet of waveguide 2. This approach removes the need for a curved waveguide to change the direction of the laser beam (as was shown in FIG. 2a). The mirror is readily formed in the slider as part of the wafer process, as will be described in detail further on.

Figure 4A:
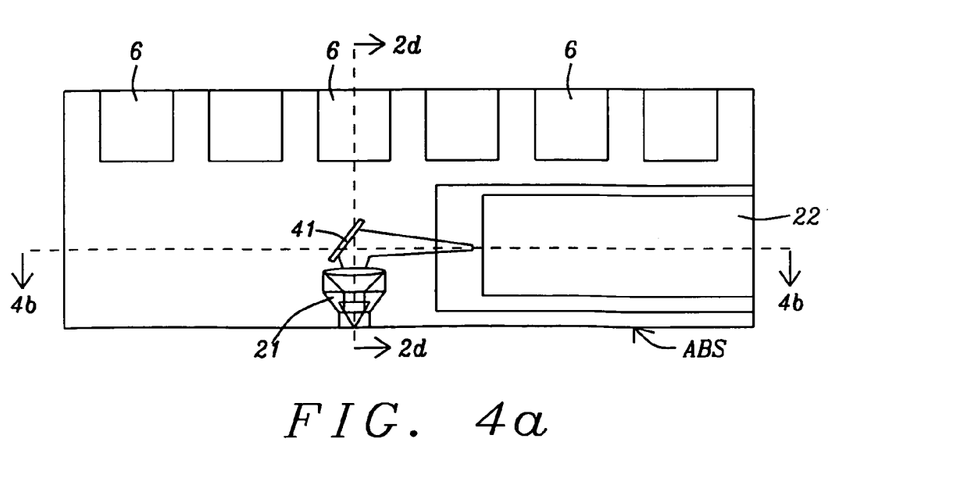
FIGS. 4a-4b illustrate a second embodiment of the invention in which focusing is achieved by means of a flat mirror in combination with a cylindrical lens.
Figure 4B:
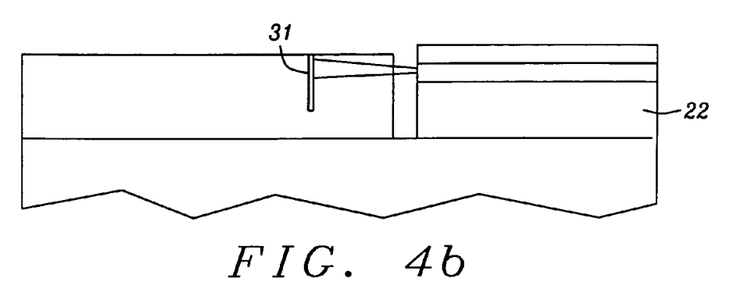

For the third embodiment, flat mirror 41 is used in combination with lens 43, as shown in FIG. 4a, FIG. 4b being a cross-section as marked. Flat mirror 41 serves to change the direction of the laser beam while lens 43 focuses or collimates the beam to most efficiently couple it to waveguide 2.

For all three embodiments, it may be necessary to reduce the effects of laser light that gets back reflected from the entrance of the slider cavity into the LD. Such reflected laser light into the LD could affect the stability of the LD and may possibly cause the laser output power to fluctuate. Further details on how to overcome this problem are presented below.

Figure 5A:
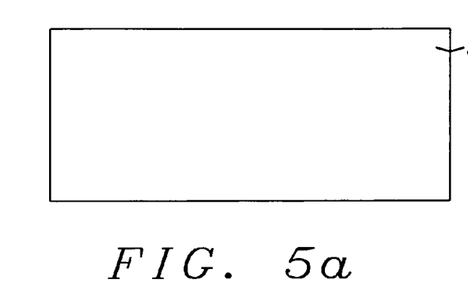
Figure 5B:
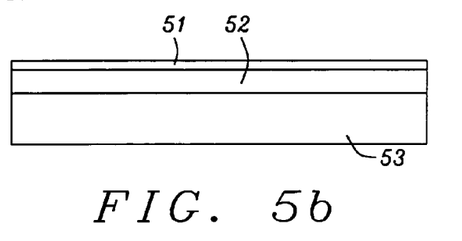

Now begins a description of processes for manufacturing the various embodiments of the present invention. Note that, for the ten pairs of figures that we reference below, all figures whose names include the suffix 'a' represent plan views while those whose names include the suffix 'b' are cross-sections. Beginning with the first embodiment, we refer now to FIGS. 5a and 5b:

Bottom cladding layer 52 (typically $Al_2O_3$) is deposited to a thickness in the range of from 400 to 2,000 nm onto substrate 53 of AlTiC, the latter having been selected for this purpose because of its mechanical properties. Then, core waveguide layer 51 (typically $Ta_2O_5$) is deposited to a thickness in the range of from 100 to 800 nm onto layer 52. $Ta_2O_5$ was selected because of its relatively high dielectric constant but similar materials such as $TiO_2$, Si, SiON, ZnO, BN, ZnS, diamond, Ta, and AlN could have been used without affecting the basic operating principles of the invention.

Figure 6A:
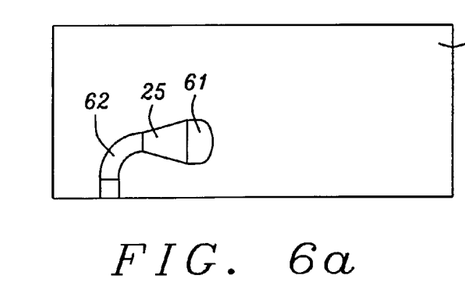
Figure 6B:
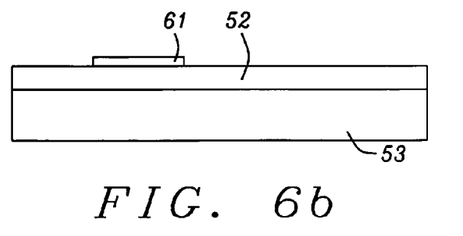

Next, as shown in FIGS. 6a and 6b, cylindrical lens 61 is formed at the front end of curved waveguide 62 by patterning layer 51 using standard photolithographic techniques. Curved waveguide 62 serves to alter the direction of waveguide light flow by about 90 degrees before the latter reaches back end 2 of the waveguide. Lens 61 is given a radius of curvature in a range of from 1 to 50 microns whereby its focal length is in a range of from 0.5 to 25 microns.

Figure 7A:
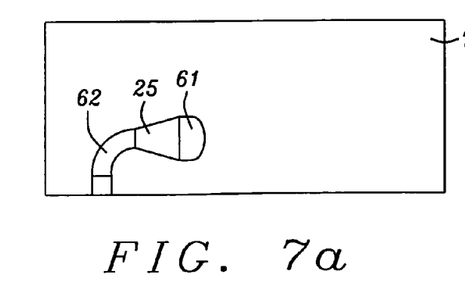
Figure 7B:
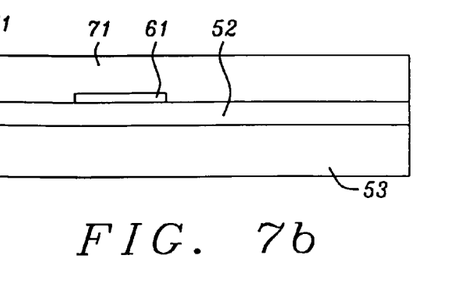
Figure 8A:
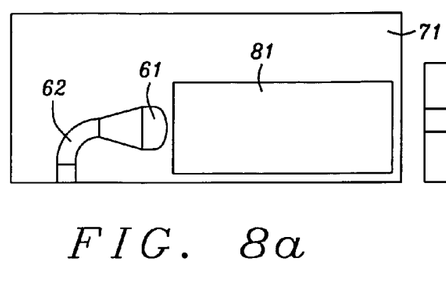
Figure 8B:
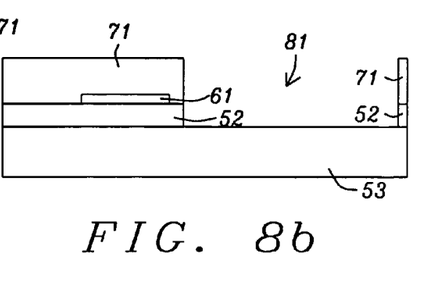

As illustrated in FIGS. 7a and 7b, formation of the first embodiment concludes with the deposition of top cladding layer 71 (usually of, but not limited to, $Al_2O_3$), following which cavity 81 is formed by etching down to the level of AlTiC layer 53. As shown in FIG. 8a, cavity 81 begins at the very edge of lens 61. In general, cavity 81 may have a length of from 100 to 600 microns, a width of from 50 to 150 microns and a depth of from 10 to 50 microns.

Figure 8C:
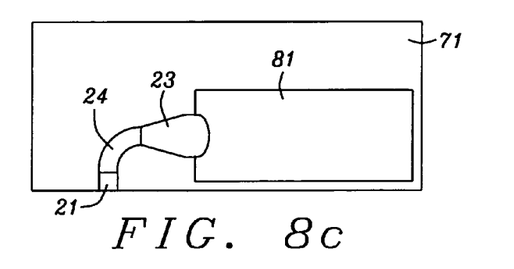
FIG. 8c illustrates how the wall of the LD cavity can be used as a lens.

Note that the curved surface of the lens can be made to also be part of the cavity's surface where the latter faces the lens. This is illustrated in FIG. 8c.

Figure 9A:
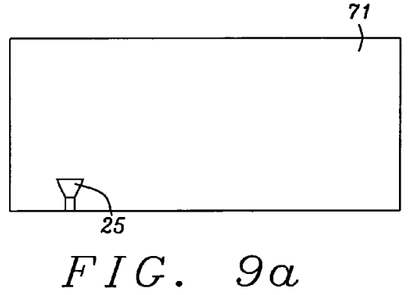
FIGS. 9a and 9b show the common starting point for manufacturing both the second and third embodiments.
Figure 9B:
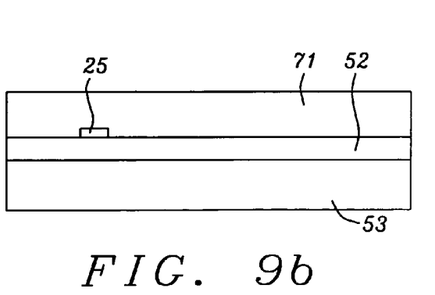
Figure 10A:
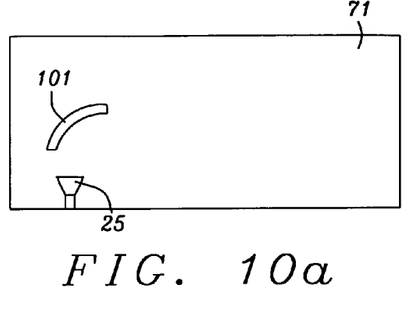
Figure 10B:
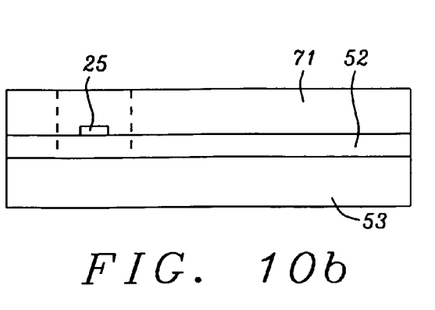
Figure 11A:
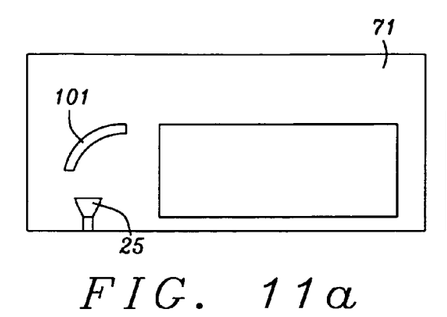
Figure 11B:
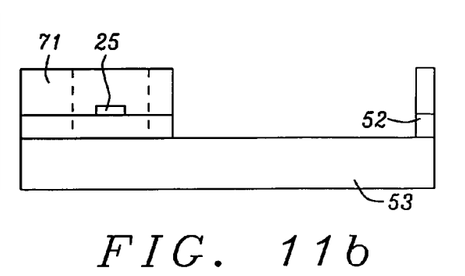

When manufacturing the second embodiment, no bend is inserted in the path followed by the wave-guide nor is there a lens at its end (see FIGS. 9a and 9b). As shown in FIGS. 10a and 10b, trench 101 is etched down to the level of layer 53 (or to within a few microns therefrom), using a liftoff mask that is left in place at this time. When seen in plan view (10a), trench 101 has a C-shape whereby, when its sidewalls are coated with a reflective material, it can serve as a concave mirror spherical or parabolic) to focus diverging light from LD 22 into wave-guide 2 as seen originally in FIG. 3a.

Figure 12A:
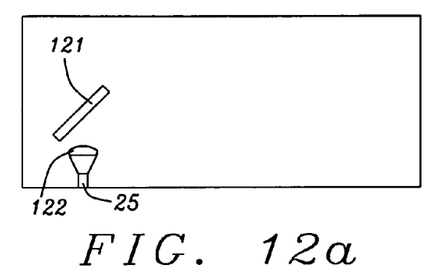
Figure 12B:
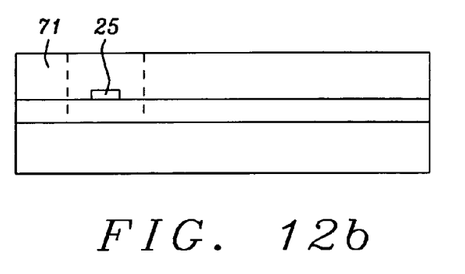
Figure 13A:
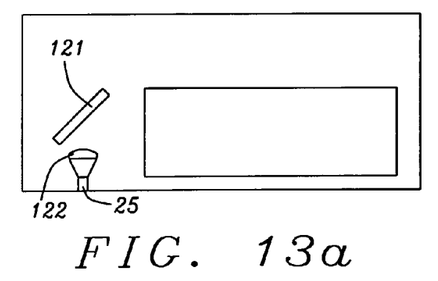
Figure 13B:
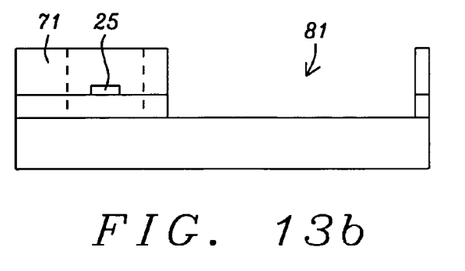

Manufacture of the third embodiment begins in the same manner as was shown for the second embodiment in FIGS. 9a and 9b above) so there is no bend in the path of WG 25, However, WG 25 terminates at lens 122 as shown in FIGS. 12a and 13a. Also shown there is trench 121 which is formed by etching down to the level of layer 53 using a liftoff mask that is left in place at this time. When seen in plan view, this trench has a rectangular shape whereby, when coated with a reflective material, it can serve as a flat mirror to direct diverging light from LD 22 into wave-guide 2 by way of lens 122 as seen originally in FIG. 4a.

The next step, used during the formation of both the second and third embodiments, is to coat the inside surface (of the trench) that is closest to LD 22 with a suitable reflective material such as gold, aluminum, silver or copper, or any of the alloys of these materials. Tilting the surface-to-be-coated and/or the evaporant source toward one another during deposition readily accomplishes this. Alternatively, sputter deposition at pressures in excess of about $10^{-4}$ Torr may be used to coat all walls of the trench. Once the inside of the trench has been coated to a thickness of at least 100 nm, the deposition process is terminated and the photoresist can be lifted off in the usual manner.

Figure 16A:
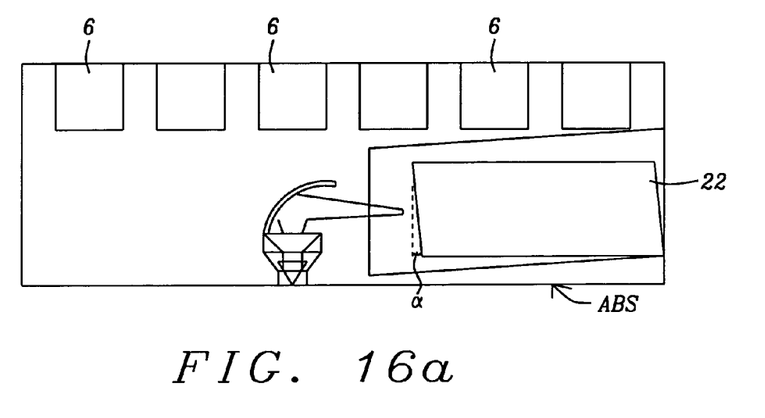
FIGS. 16a and 16b illustrate two methods for preventing back-reflection of light into the laser diode light source.

As was noted earlier, laser light that gets reflected from the wall of the slider cavity back into the LD may cause a problem as it could affect the stability of the LD and possibly cause fluctuation in the laser's output power. Therefore, as an additional feature of the present invention, two solutions to this problem are disclosed:

(i) The LD is mounted at an angle α (in a range of from 5 to 25 degrees) relative to the wall of the cavity. This is illustrated in FIG. 16a.

Figure 16B:
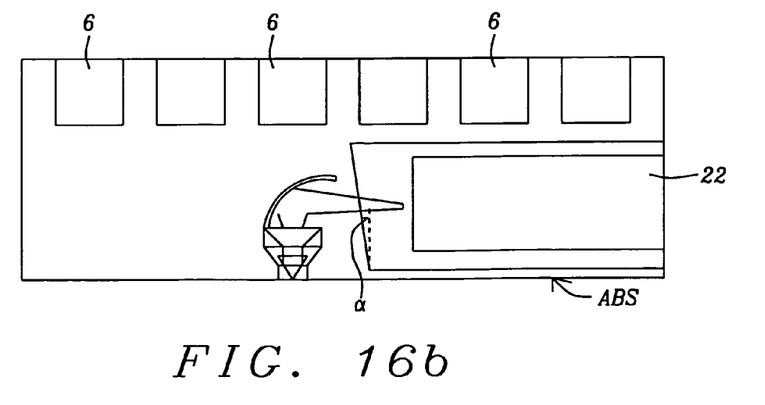

(ii) The wall of the slider cavity immediately facing the emitting end of the LD is given slope α (in as range of from 5 to 25 degrees) away from this wall.

Figure 14A:
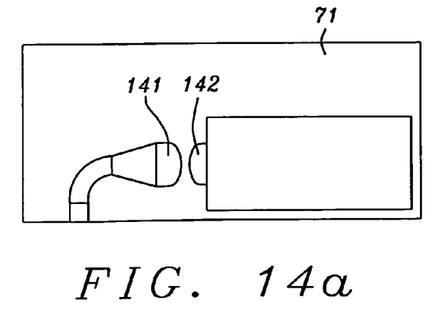
FIGS. 14a and 14b illustrate a fourth embodiment of the invention in which focusing is achieved using two lenses.
Figure 14B:
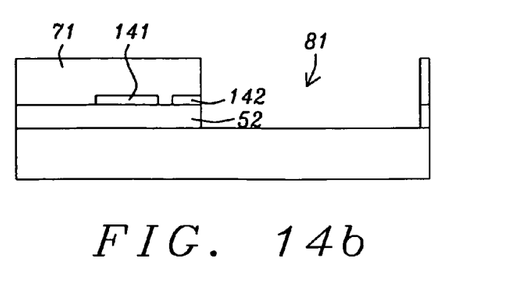

In FIGS. 14a and 14b we illustrate a fourth embodiment of the invention that is similar to the first embodiment except that lens 141 (at the termination of WG 25) is less strongly curved than was lens 23 of the first embodiment. Typically lens 141 is given a radius of curvature in a range of from 2 to 75 microns whereby its focal length is in a range of from 1 to 35 microns. Focusing of light from LD 22 onto WG 25 is achieved by inserting second lens 142 in the optical path as shown. Typically, lens 142 has a radius of curvature in a range of from 2 to 75 microns whereby its focal length is in a range of from 1 to 35 microns.

Lens 142 is located up against the inside wall of slider cavity 22. The advantages of this configuration are (i) better optical alignment, improved tolerance, and greater flexibility, (ii) having the lenses' flat facets facing the divergent LD beam together with the lower lens curvatures, reduces the amount of spherical aberration in the system.

Figure 15A:
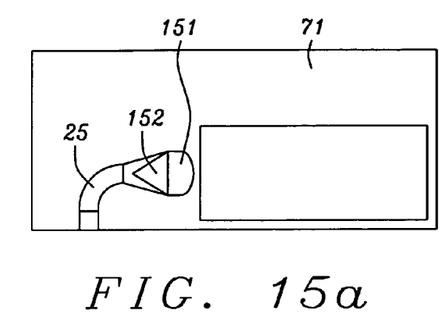
FIGS. 15a and 15b illustrate a fifth embodiment of the invention in which three dimensional focusing is achieved through use of a cylindrical lens in combination with a tapered dielectric structure.
Figure 15B:
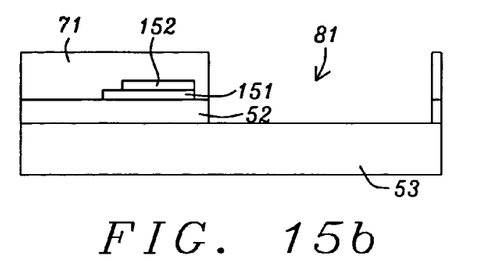

A fifth embodiment of the invention is shown in FIGS. 15a and 15b. Its basic configuration is the same as for the first embodiment except that second dielectric layer 152 (of $Ta_2O_5$ or similar dielectric material) is deposited onto first dielectric layer 151 and then patterned into the triangular shape seen in FIG. 15a.

Second WG layer 152 serves to increase the WG thickness thereby improving matching with the LD mode in the vertical direction. The triangular shape given to layer 152 helps to guide the light from layer 152 into lower layer 151.

By arranging for the apex of this triangle to point away from the LD light source, photons entering at the level of layer 152 get squeezed as they approach the triangle's apex causing them to descend and then enter layer 151 through its interface with layer 152. Thus some of the light gets directed downwards thereby behaving in a manner similar to what occurs during conventional optical 3D focusing.

Differences and Advantages

The main differences between the present invention and the prior art include:
1. Presence of LD mounted does not significantly alter the slider footprint.
2. Improved focusing is integrated with the light delivery system.

The advantages of the current proposal include:
1. Reduced number of external components.
2. Slider height is unchanged and a simple suspension can be used with no penalty to the disk-disk spacing of the drive.
3. Low cost mass production is facilitated since the LD can be mounted at wafer, bar, or slider levels for prototyping convenience or to increase manufacturing throughput.
4. Improved shock robustness
5. Improved coupling efficiency between the LD and the waveguide.
6. Alignment of the LD relative to the waveguide facilitated.
7. Good thermal attachment is provided for the slider.

What is claimed is:

1. A process for manufacturing a feature that facilitates thermally assisted magnetic recording by a magnetic write head having a main write pole and an air bearing surface (ABS), comprising:
   providing a substrate having an edge that is coplanar with said ABS;
   depositing a bottom cladding layer on said substrate;
   depositing a first wave-guide (WG) layer on said bottom cladding layer;
   patterning said first WG layer to form a first WG having orthogonal first and second sections that are linear and that have first and second ends respectively, said first and second sections being connected to one another through a curved section;
   further patterning said first end so that it has a curved shape whereby said first end is a first cylindrical lens;
   disposing said second end to be within 500 nm of said main write pole and to terminate at said ABS;
   then depositing a top cladding layer to fully cover said substrate;
   then forming a cavity that extends through said top cladding layer as far as said substrate, including all layers between said top cladding layer and said substrate, said cavity having a wall that faces said first cylindrical lens and is within 10 microns therefrom; and
   then mounting and orienting a laser diode (LD) within said cavity whereby light emitted by said LD enters said WG after being focused by said first cylindrical lens.

2. The process recited in claim 1 wherein said substrate is AlTiC.

3. The process recited in claim 1 wherein said top and bottom cladding layers are each formed from a material selected from the group consisting of $Al_2O_3$, $SiO_2$, SiON, MgO, and $MgF_2$ and wherein each is deposited to a thickness in the range of from 400 to 2,000 nm.

4. The process recited in claim 1 wherein said WG layer is selected from the group consisting of $Ta_2O_5$, $TiO_2$, Si, SiON, ZnO, BN, ZnS, diamond, Ta, and AlN] and is deposited to a thickness in a range of from 100 to 800 nm.

5. The process recited in claim 1 wherein said curved shape is an arc of a cylinder.

6. The process recited in claim 1 wherein said cylindrical lens is given a radius of curvature in a range of from 1 to 50 microns whereby its focal length is in a range of from 0.5 to 25 cm.

7. The process recited in claim 1 further comprising patterning said WG layer to form a second cylindrical lens having a flat first surface that is part of said wall and an opposing, convex second surface that extends away from said wall towards said first cylindrical lens.

8. The process recited in claim 1 wherein said cavity has dimensions of from 100 to 600 microns by from 50 to 150 microns.

9. The process recited in claim 1 wherein said cavity has dimensions of from 250 to 350 microns by from 80 to 120 microns.

10. The process recited in claim 1 further comprising:
   depositing a second WG layer onto said first WG layer;
   then patterning said second WG layer into a triangle whose base lies directly above said first cylindrical lens and whose apex points away from said LD, whereby photons entering said second WG layer are diverted into said first WG layer thereby effectively achieving three dimensional focusing of divergent light from said LD.

11. A process for manufacturing a feature that facilitates thermally assisted magnetic recording by a magnetic write head having a main write pole and an air bearing surface (ABS), comprising:
   providing a substrate having an edge that is coplanar with said ABS;
   depositing a bottom cladding layer on said substrate;
   depositing a wave-guide (WG) layer on said bottom cladding layer;
   patterning said WG layer to form a linear WG that extends upwards away from said ABS for a distance;
   then depositing a top cladding layer to fully cover said substrate, including said WG;

then forming a trench having opposing major sidewalls and a cavity having a wall that faces said trench, both said trench and said cavity having a depth that extends from said top cladding layer down to said substrate;

orienting said trench so that, on average, said opposing major sidewalls lie at an angle of 45 degrees relative to said cavity wall;

then selectively coating a major sidewall that is closest to said cavity, with a layer of reflective material; and then mounting and orienting a laser diode (LD) within said cavity whereby light emitted by said LD enters said WG after being reflected by said layer of reflective material.

12. The process recited in claim 11 wherein said distance over which said WG extends away from said ABS is in a range of from 10 to 100 microns.

13. The process recited in claim 11 wherein said layer of reflective material is selected from the group consisting of gold, silver, aluminum, and copper.

14. The process recited in claim 11 wherein said trench, when viewed from above, has a curved shape whereby said light emitted by said LD is brought to a focus on an end of said WG that is furthest from said ABS.

15. The process recited in claim 14 wherein said curved shape is selected from the group consisting of spherical and parabolic shapes.

16. The process recited in claim 11 further comprising:
patterning an end of said WG, that is farthest from said ABS, to serve as a cylindrical lens; and
shaping said trench so that, when viewed from above, said trench has a linear shape, whereby said light emitted by said LD is brought to a focus on said WG by said cylindrical lens.

17. A feature to facilitate thermally assisted magnetic recording by a magnetic write head having a main write pole and an air bearing surface (ABS), comprising:
a substrate having an edge that is coplanar with said ABS;
a bottom cladding layer on said substrate;
on said bottom cladding layer, a first wave-guide (WG) having orthogonal linear first and second sections that have first and second ends respectively, said first and second sections being connected by a curved section;
said first end having a curved shape whereby said first end is a first cylindrical lens;
said second end being located within 500 nm of said main write pole and terminating at said ABS;
a top cladding layer that fully covers said substrate;
a cavity that extends through said top cladding layer as far as said substrate, said cavity having a wall that faces said first cylindrical lens and that is within 10 microns therefrom; and
within said cavity, a laser diode (LD) oriented so that light emitted by said LD enters said WG after being focused by said first cylindrical lens, said LD having an output face that is tilted at an angle of between 5 and 25 degrees relative to an input face of said WG, thereby reducing back reflection of light into said LD.

18. The feature described in claim 17 wherein said substrate is AlTiC.

19. The feature described in claim 17 wherein said top and bottom cladding layers are formed from a material selected from the group consisting of $Al_2O_3$, $SiO_2$, SiON, MgO, and wherein each cladding layer has a thickness in the range of from 400 to 2,000 nm.

20. The feature described in claim 17 wherein said WG layer is selected from the group consisting of $Ta_2O_5$, $TiO_2$, Si, SiON, ZnO, BN, ZnS, diamond, Ta, and AlN and has a thickness in a range of from 100 to 800 nm.

21. The feature described in claim 17 wherein said curved shape is an arc of a cylinder.

22. The feature described in claim 17 wherein said first cylindrical lens has a radius of curvature in a range of from 2 to 75 microns whereby its focal length is in a range of from 1 to 35 microns.

23. The feature described in claim 17 further comprising a second cylindrical lens having a flat first surface that is part of said wall and an opposing, convex second surface that extends away from said wall towards said first cylindrical lens.

24. The feature described in claim 17 wherein said cavity has dimensions of from 100 to 600 microns by from 50 to 150 microns.

25. The feature described in claim 17 wherein said cavity has dimensions of from: 250 to 350 microns by from 80 to 120 microns.

26. The feature described in claim 17 further comprising:
on said first WG layer, a second WG layer shaped as a triangle, said triangle's base being directly above said first cylindrical lens and said triangles apex pointing away from said LD, whereby photons entering said second WG layer are diverted into said first WG layer thereby effectively achieving three dimensional focusing of divergent light from said LD.

27. A feature to facilitate thermally assisted magnetic recording by a magnetic write head having a main write pole and an air bearing surface (ABS), comprising:
a substrate having an edge that is coplanar with said ABS;
a bottom cladding layer on said substrate;
a linear WG on said bottom cladding layer that extends upwards away from said ABS for a distance;
a top cladding layer that fully covers said substrate, including said WG;
a trench having opposing major sidewalls and a cavity having a wall that faces said trench, both said trench and said cavity having a depth that extends from said top cladding layer down to said substrate;
said trench being oriented so that, on average, said opposing major sidewalls lie at an angle of 45 degrees relative to said cavity wall;
a reflective coating on said trench's major sidewall that is closest to said cavity; and
within said cavity, a laser diode (LD) that is oriented so that light emitted by said LD enters said WG after being reflected by said reflective coating.

28. The feature described in claim 27 wherein said distance over which said WG extends away from said ABS is in a range of from 10 to 100 microns.

29. The feature described in claim 27 wherein said layer of reflective material is selected from the group consisting of gold, silver, aluminum, and copper.

30. The feature described in claim 27 wherein said trench, when viewed from above, has a curved shape, whereby said light emitted by said LD is brought to a focus at said WG.

31. The feature described in claim 30 wherein said curved shape is selected from the group consisting of spherical and parabolic shapes.

32. The feature described in claim 27 further comprising:
said trench, when viewed from above, having linear sidewalls; and
an end of said WG, that is farthest from said ABS, being shaped to function as a cylindrical lens whereby light emitted by said LD is brought to a focus at said WG.

* * * * *